Oct. 14, 1952     E. B. MOSS ET AL     2,614,244
ELECTRICAL INDICATING DEVICE

Filed Dec. 7, 1948     4 Sheets-Sheet 1

INVENTORS
ERIC BEECROFT MOSS
CHARLES WILLIAM COOPER

BY Moore & Hall
Attys.

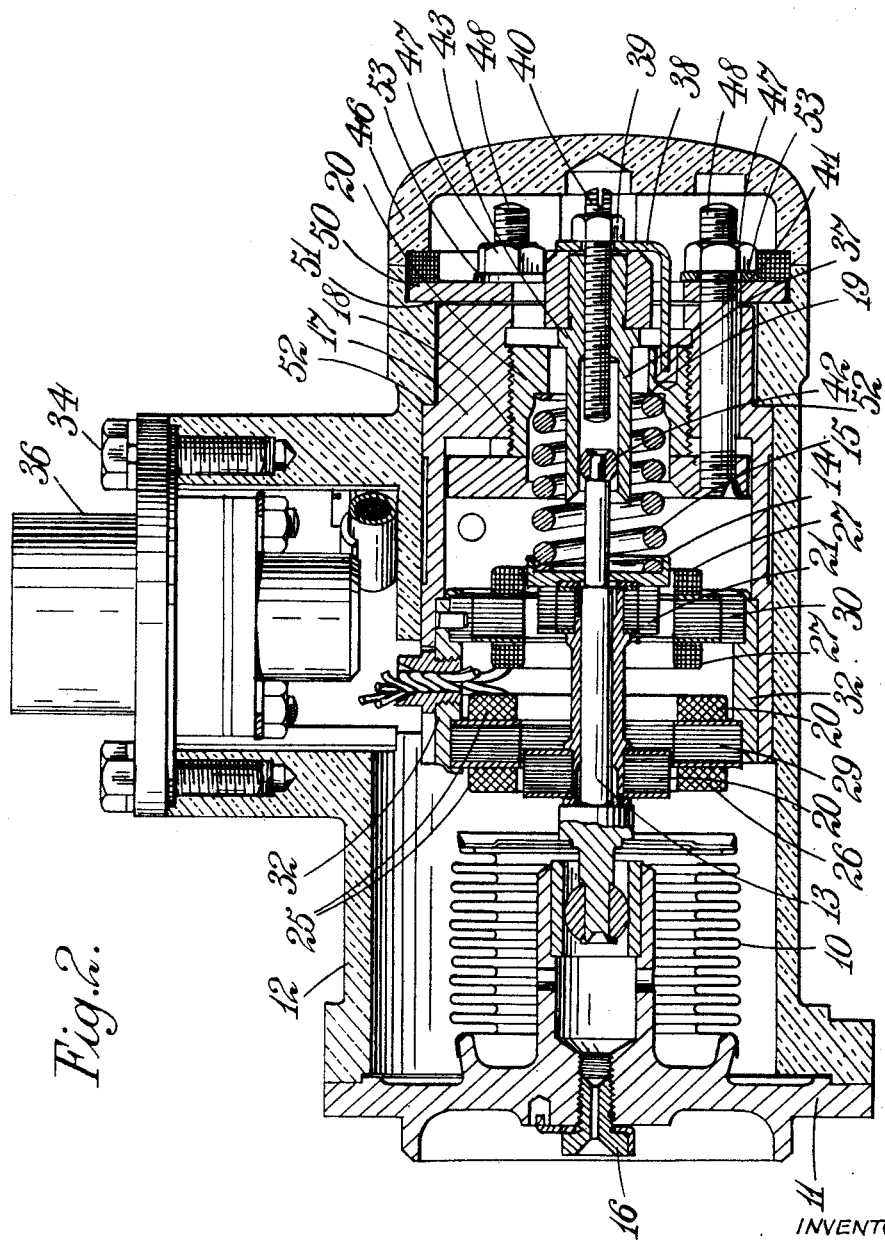

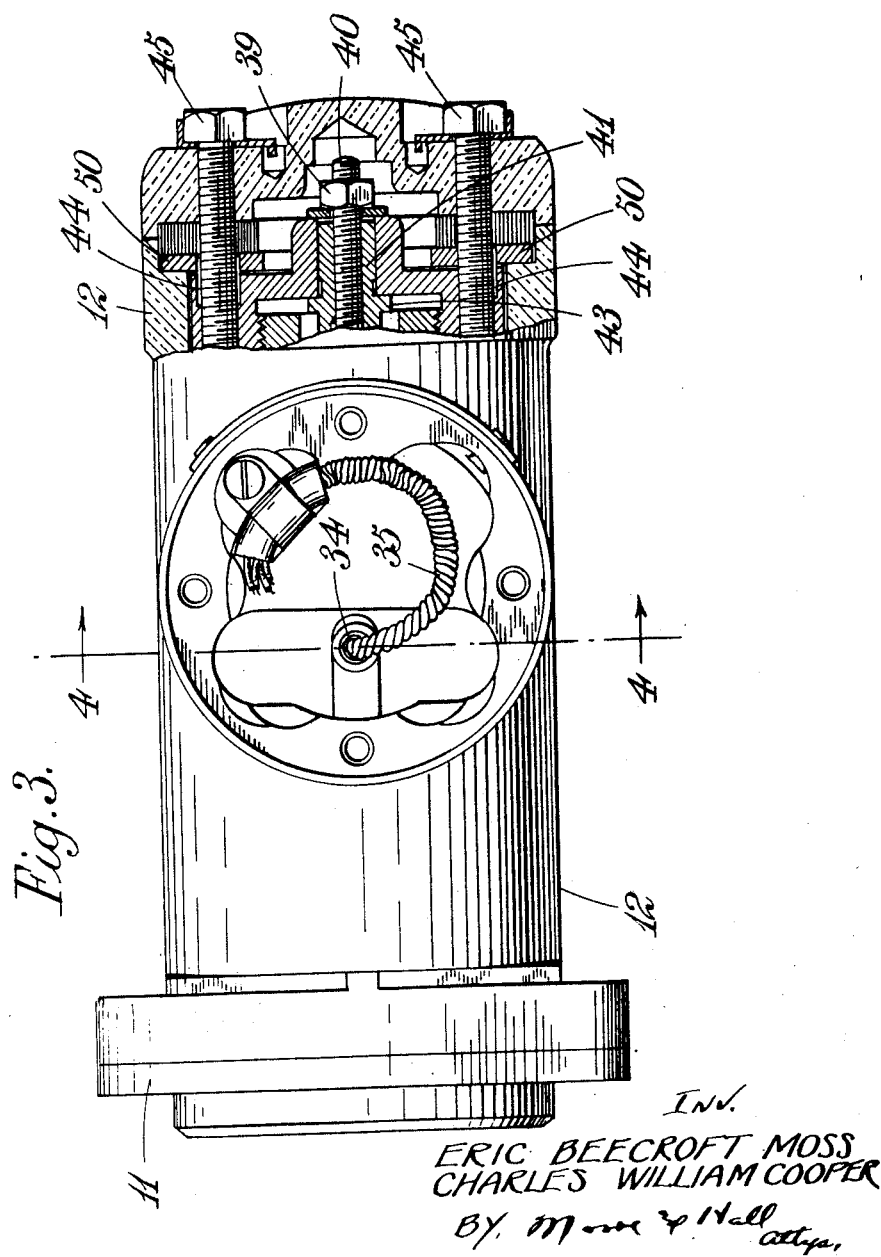

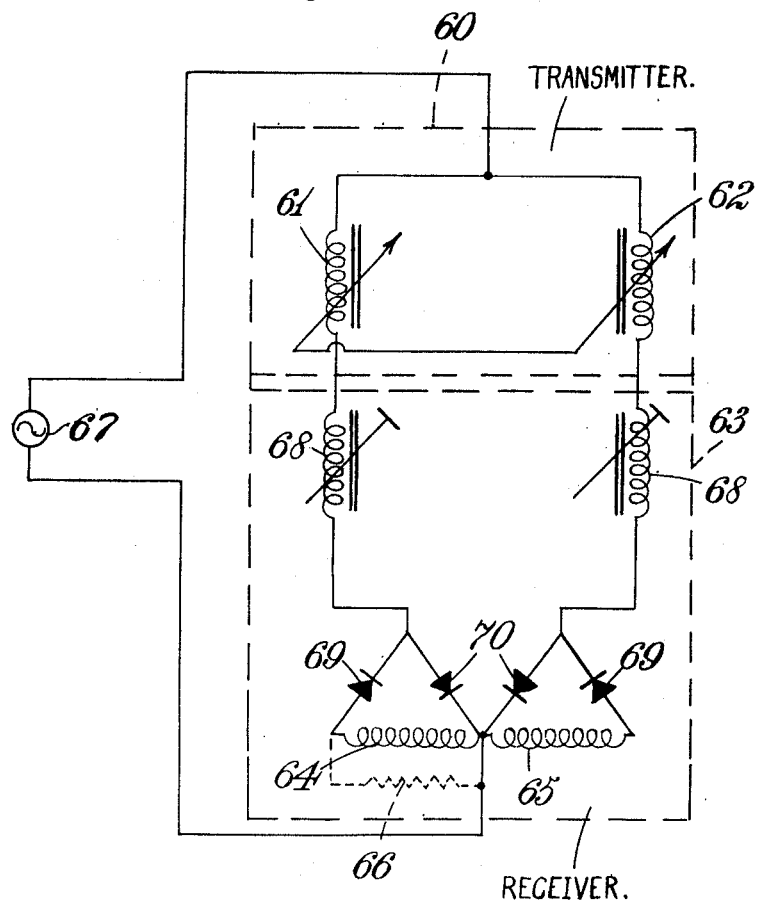

UNITED STATES PATENT OFFICE 2,614,244

ELECTRICAL INDICATING DEVICE

Eric Beecroft Moss and Charles William Cooper, Cricklewood, London, England

Application December 7, 1948, Serial No. 63,874
In Great Britain October 31, 1947

8 Claims. (Cl. 323—83)

This invention relates to electrical indicating devices and has a particular application in devices for providing an indication at a remote point of the displacement of an element.

One object of this invention is to provide an indicating device energised by an alternating current power supply, the indication of which is not altered by changes in the voltage and/or the frequency of the power supply.

According to this invention, an electrical indicating device comprises a pair of impedances energised in parallel by an alternating current power supply, means for varying the magnitude of one or both impedances so that the ratio of their impedance varies in accordance with a quantity to be indicated and means for indicating the ratio of the currents through the two impedances.

The aforesaid means for varying the magnitude of the impedances may be so arranged that one impedance increases as the other decreases.

Preferably each of said impedances comprises a variable inductor and in this arrangement one or each of the inductors may comprise a coil or coils associated with a ferro-magnetic armature, means being provided for varying the position of the armature in relation to said coil or coils in accordance with the quantity to be indicated so as to vary the impedance of the inductor in the required manner.

The indicating means may comprise a ratiometer of any appropriate type.

In the arrangement in which an armature is associated with each inductor, the two armatures may be carried on a single mounting and spaced thereon a fixed distance apart in the direction of movement of the armatures relative to the coils and the coils associated with the two armatures are spaced apart in said direction of movement by a distance different from the spacing of the armature. For example, the armature may be slightly further apart than the coils so that when the mid-point of the armature mounting coincides with the mid-point of the coil mounting, then a movement in one direction will make one armature move close to its associated coil whilst the other armature moves away from its associated coil.

Each armature may be so shaped that, by relative rotation of the armature and its associated coil or coils about an axis in said direction of movement, the inductance of the coil or coils is varied. If the axial spacing between the armatures differs from the axial spacing between the coils, then in general, the two armatures are not similarly situated with regard to their respective coils and the effect of the armature rotation will differ for the two inductors. Thus, the relative rotation of the armatures and their associated coils causes the ratio of the impedances of the two inductors to vary, and therefore enables the calibration to be adjusted.

Preferably in an indicating device according to the present invention the impedances have low loads at the frequency of the alternating current power supply, whereby the indication provided is substantially independent of slight variations in supply frequency, such as are inevitable in practice.

The indicating device according to this invention is particularly suitable for providing an indication of a pressure at a remote point. Thus according to a further feature of the invention, an electrical indicating device, of the kind herein before described and in which at least one of the inductors comprises a coil or coils with a movable armature, is provided with a pressure bellows arranged to alter the position of the movable armature relative to the coil or coils in accordance with a pressure to be indicated by said indicating means.

The following is a description of one embodiment of the invention, reference being made to the accompanying drawings, in which, Figure 1 is an end view of a transmitter of a pressure indicating device with the cover plate partly cut away;

Figure 2 is a transverse section along the line 2—2 of Figure 1;

Figure 3 is a plan view with the plug assembly removed and partly in section along the line 3—3 of Figure 1;

Figure 5 is a circuit diagram of the indicating device.

Figure 1:
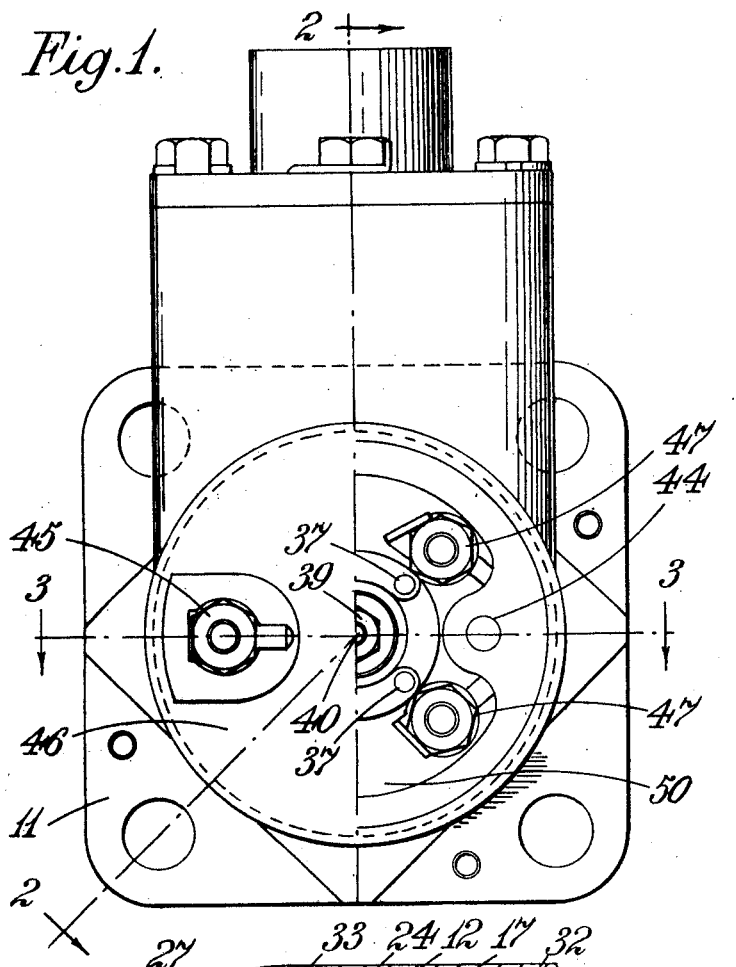

As is best seen in Figure 2, the transmitter of the remote pressure indicating device is provided with a pressure bellows 10, one end of which is secured to an end plate 11 which is bolted to the main body part 12 of a housing. The free end of the bellows is secured to one end of an aluminium alloy rod 13 which forms an armature mounting. To the other end of the rod is fixed a cup 14 adapted to receive one end of a helical spring 15 which applies a resisting force to the rod 13 and hence to the bellows 10 along the axis of the housing. The pressure to be measured is applied through a suitable connecting nozzle 16 in the end plate 11 to the inside of the bellows 10 so that the armature mounting 13 will be displaced along the axis of the housing by an amount according to the pressure applied.

The housing 12 is made of a non-magnetic material such as aluminium alloy and towards the end remote from the bellows is provided with an internal sleeve 17 which is of cylindrical form about the axis of the rod 13 and the spring and which is provided with an internal screw thread 18. The end of the helical spring 15 remote from the armature bears against an internal shoulder 19 in the bore of a cylindrical element 20 which is provided with an external screw thread adapted to engage the internal thread 18 of the sleeve. Thus, as will be described later, by rotation of this element the initial pressure of the helical spring may be adjusted.

Figure 4:
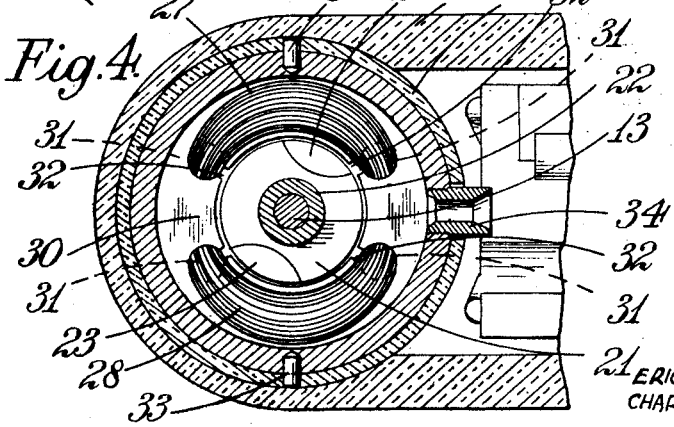
Figure 4 is part of a section along the line 4—4 of Figure 3.

The armature mounting carries two armatures 20, 21 spaced apart one at each end of the bush 22 carried on the rod 13 and each formed of laminated ferro-magnetic material, the laminations lying in a plane transverse to the axis of the housing. As is seen in Figure 4, in section in this transverse plane each armature is circular but has two segments 23, 24 cut away on opposite sides of the axis. Thus in one diametral direction the armature has a greater diameter than in the transverse direction.

The two armatures are arranged on the mounting with their corresponding respective diametral axes of symmetry at right angles to one another.

Associated with each armature is a pair of coils 25, 26 and 27, 28 wound on laminated annular cores 29, 30 encircling the armatures. Each core has its axis substantially on the armature axis and an internal diameter slightly greater than the larger diameter of the armature. Each core has two pairs of axial holes as indicated by the references 31 on Figure 4 which holes are symmetrically situated on opposite sides of a diameter, the axis of the two holes of a pair subtending an angle of 120° at the axis of the core. Each hole is connected by a radially extending slot 32 to the inner side of the core to facilitate winding of the coils as each coil is wound so that its turns pass through both the holes of a pair. Each turn of a coil thus passes along a sector on one face of the core, through one of the holes 31, thence back along the opposite face of the core to other hole 31. The two coils on diametrically opposite sides of the core are connected in series so as to form a single inductor. It will be seen that the inductance of this inductor will vary with the axial displacement of the armature and will also vary as the armature is rotated being greater when the larger diameter of the armature lies in this path.

The coils associated with each armature are similar and the two cores are carried on a spacer 32 which is arranged so that the distance apart axially of the cores 29 and 30 and their coils is less than the axial spacing of the armatures 20, 21. Thus axial movement of the armature mounting 13 will move one armature closer to its associated coils as the other armature moves away from its coils. The spacer 32 is arranged so that the two coils on one core are situated similarly on opposite sides of a diameter at right angles to the corresponding diameter of the other pair of coils so as to reduce coupling to a minimum.

The spacer 32, which with its associated coils forms a stator, is provided with a cylindrical outer surface adapted to fit in a cylindrical part of the sleeve 17 in the housing 12, and is secured by pins 33.

A tapped hole is provided through the spacer 32 and the sleeve 17 to accommodate a lead ferrule 34 through which the leads 35 from the coils are taken to a connecting plug 36 which is mounted on the housing.

Since the axial spacing between the armatures 20, 21 differs from the axial spacing of the inductor coils, the effect on the inductances of the two inductors of rotation of the armature differs and use is made of this feature to compensate for variations in calibration between different instruments as will be described hereinafter. In this instrument the adjustment is made by rotating the stator assembly including the spacer 32 and sleeve 17. This adjustment has to be effected without rotation of the armature and without altering the tension of the spring 15.

As previously explained, the spring tension is adjusted by rotating the threaded cylindrical element 20 in the sleeve 17. This rotation is effected by means of the four axially extending holes 37 (Figures 1 and 2) in the outer end of the element 20 and, after adjustment, the element 20 is locked to the sleeve 17 by means of a locking tab 38 which is secured by a nut 39. This nut is carried on a grub-screw 40 which extends into the bore of a bush 41 in which slides an enlarged bearing portion 42 at the end of the armature carrying rod 13. The grub-screw 40 thus also serves to limit the travel of the armature if an excessive pressure is applied to the bellows. The bush 41 is provided with an outwardly extending flange 43 which abuts against a shoulder on the sleeve 17 and is drawn towards the shoulder when the nut 40 is tightened.

Two holes 44 (Figure 1) are provided for rotating the stator within the housing. These two holes are extended inwardly with tapped portions to receive the bolts 45 which secure the end cover plate 46 of the housing. For locking the stator after adjustment, there are provided four nuts 47 carried on bolts 48. The heads of these bolts are secured in a first clamping ring 49 which abuts the end of the cylindrical element 20. Tightening of the nuts 47 draws this clamping ring 49 towards a second clamping ring 50 which abuts against an inwardly extending shoulder 51 on the outer housing 12. The outer surface of the sleeve 17 is also provided with a shoulder 52 which engages a corresponding abutment on the inner surface of the housing so that, when the nuts 47 are tightened, the sleeve 17 is locked to the housing 12.

The assembly thus far described forms a transmitter having two inductors, the ratio of the inductances of which is altered in accordance with movement of the bellows which causes axial displacement of the armature. To compensate for variations in manufacture, such as, for example, variations in the strengths of the helical springs between different transmitters, the stator may be rotated to vary the relative inductances so adjusting the calibration of the transmitter. By means of such adjustments interchangeability of transmitters can be ensured.

The receiver, which may be located remotely from the transmitter, employs any convenient type of ratiometer such as for instance that described in the specification of U. S. Patent No. 2,457,685.

Referring to Figure 5, the transmitter is indicated diagrammatically by the rectangle 60 containing the two variable inductors 61, 62.

The receiver indicated by the rectangle 63 includes a ratiometer which has two coils 64, 65. A pre-set resistance 66 is connected in shunt across one of the coils of the ratiometer in order to compensate for any production differences in the ratiometer.

The indicating system is energised from an alternating current power supply 67 which is applied to two parallel paths each comprising in series one of the inductors 61, 62 an adjustable inductance 68, a half-wave rectifier 69 and one of the ratiometer coils 64, 65. In shunt across each rectifier 69 and ratiometer coil is connected a second half-wave rectifier 70 having opposite polarity to the rectifier 69 so that the currents through the inductors 61, 62 have no substantial D. C. component. The two adjustable inductances 68 are mounted in the same housing as the ratiometer to form a complete receiver unit and are adjusted to give correct calibration of the receiver so that the receiver units are interchangeable and may be replaced without the necessity of any further adjustment.

In operation, the ratiometer measures the ratio of the two currents through the inductors. The actual magnitudes of these currents will depend on the supply voltage and on the impedance of the inductors which impedance includes a reactance dependent on the frequency of the supply. It will readily be seen that the ratio of the currents is independent of variations in the supply voltage. In order that the ratio of the currents should be independent of frequency it is necessary with the apparatus described to make the power factor of the inductors very small and low less coils are therefore employed. Preferably the power factor is made less than 0.2.

The particular details of construction and adjustment of the receivers form no part of the present invention and in describing the setting up of the transmitter it will be assumed that the receiver has been correctly calibrated. The transmitter is assembled with the armature angularly set in a position about 25° away from the maximum inductance position. The first step in setting up the transmitter is to apply a half the maximum pressure to the bellows. Thus in an instrument for reading from 0-60 lbs. per sq. in. a pressure of 30 lbs. per. sq. in. would be applied. This should move the armatures so that they are similarly positioned with regard to their respective coils. Then by means of the four holes 37, the sleeve 17 is rotated to adjust the spring tension until the correct reading, i. e. mid-point of scale is obtained. The spring adjuster is then locked by means of the locking tab 38 and the nut 39.

In this position rotation of the stator relative to the armature will have no effect since the armatures are similarly situated with regard to their respective coils. Then the pressure is removed from the bellows. When the armature is not in its midway position (i. e. not symmetrically situated with regard to the coils) the relative inductances will be changed by rotation of the stator. The stator is rotated until a zero pressure reading is obtained and then locked by means of the four nuts 47 which are provided with locking tab washers 53. Then the nut 39 is slackened so that the grub-screw 40 can be adjusted to limit the armature travel at the desired overload pressure, after which the nut 39 is again tightened.

It will be particularly noted that by providing these facilities for adjustment of the transmitters and receivers, all the transmitters and all the receivers can be made interchangeable without the necessity for fresh adjustment on installation and replacement despite the differences that arise in the normal course of manufacture between different instruments.

We claim:
1. An electrical indicating device comprising a pair of inductors spaced apart and energized in parallel by an alternating current power supply, an armature disposed beside the inductors, said armature being linearly movable relative to the inductors so that the ratio of the impedances of the inductors varies according to the linear displacement and being rotatable relative to the inductors about an axis lying in the direction of linear movement, said armature being shaped so that rotation relative to the inductors simultaneously moves the armature towards or away from both inductors.

2. An electrical indicating device comprising a pair of inductors spaced apart and energized in parallel by an alternating current power supply, an armature mounting disposed beside the inductors, which mounting is linearly movable relative to the inductors and rotatable relative to the inductors about an axis lying in the direction of the linear movement, a pair of armatures carried on said mounting and associated respectively with the two inductors which armatures are spaced apart on the mounting in the direction of linear movement a distance differing from the spacing of the inductors so that the ratio of the impedances of the inductors varies in accordance with the displacement of the mounting, the armatures being shaped so that rotation of the mounting relative to the inductors simultaneously moves both armatures towards or away from their respective inductors.

3. An electrical indicating device comprising an armature mounting, two armatures spaced apart on said mounting, a pair of inductors associated respectively with the two armatures and energized in parallel by an alternating current power supply, each inductor being formed by two coils connected in series and disposed at equal distances on opposite sides of the armature mounting, which mounting is linearly movable relative to the inductors and rotatable relative to the inductors about an axis lying in the direction of the linear movement, the two armatures being spaced apart on the mounting in the direction of linear movement a distance differing from the spacing of the inductors so that the ratio of the impedances of the inductors varies in accordance with the displacement of the mounting and the armatures being shaped so that rotation of the mounting relative to the inductors simultaneously moves both armatures towards or away from the coils of their respective inductors.

4. An electrical indicating device comprising an armature mounting, two armatures spaced apart on said mounting, a pair of inductors associated respectively with the two armatures and energised in parallel by an alternating current power supply, each inductor being formed by two coils connected in series and disposed at equal distances on opposite sides of the armature mounting, which mounting is linearly movable relative to the inductors and rotatable relative to the inductors about an axis lying in the direction of the linear movement, the two armatures being spaced apart on the mounting in the direction of linear movement a distance differing from the spacing of the inductors, the armatures being non-circular in shape in a plane at right angles to said direction of linear movement and having a diameter in one direction in said plane greater than the diameter in a transverse direction.

5. An electrical indicating device according to claim 4 wherein the two coils of each inductor are co-axial, the axis of the two inductors being at right angles to one another and to said direction of linear movement and wherein the two armatures are of similar shape but with their corresponding diameters at right angles to one another.

6. An electrical indicating device comprising a housing, an armature mounting linearly movable in the housing, a coil support rotatably mounted in the housing for rotation about an axis lying in the direction of the linear movement of the armature mounting, a pair of inductors mounted on said coil support and spaced apart in said direction of linear movement, a pair of armatures carried on said armature mounting associated respectively with the two inductors, the armatures being spaced apart a distance differing from the spacing of the inductors and shaped so that rotation of the coil support in the housing simultaneously moves both inductors towards or away from their respective armatures.

7. An electrical indicating device comprising a pair of inductors spaced apart and energised in parallel by an alternating current power supply, an armature mounting disposed beside the inductors, which mounting is linearly movable relative to the inductors and rotatable relative to the inductors about an axis lying in the direction of linear movement, and a pair of armatures carried on said mounting and associated respectively with the two inductors which armatures are spaced apart on the mounting in the direction of linear movement a distance greater than the spacing of the inductors so that the ratio of the impedances of the inductors varies in accordance with the displacement of the mounting, the armatures having a diameter in one direction, at right angles to the direction of linear movement, which is greater than a diameter in a different direction at right angles to the direction of linear movement, rotation of the said mounting relative to the inductors simultaneously moving both armatures towards or away from their respective inductors.

8. A pressure indicator comprising a pair of inductors spaced apart and energised in parallel by an alternating current power supply, an armature mounting disposed beside the inductors which mounting is linearly movable relative to the inductors and rotatable relative to the inductors about an axis lying in the direction of the linear movement, a pair of armatures carried on said mounting and beside said inductors, said armatures being spaced part on the mounting in the direction of linear movement a distance differing from the spacing of the inductors so that the ratio of the impedances of the inductors varies in accordance with the displacement of the mounting, the armatures each having a substantially circular periphery and having segments cut away from predetermined portions of said peripheries, rotation of the said mounting relative to the inductors simultaneously moving both armatures towards or away from their respective inductors.

ERIC BEECROFT MOSS.
CHARLES WILLIAM COOPER.

REFERENCES CITED

The following references are of record in the file of this patent:

UNITED STATES PATENTS

| Number | Name | Date |
|---|---|---|
| 2,183,073 | Kemler | Dec. 12, 1939 |
| 2,390,328 | Roberts | Dec. 4, 1945 |
| 2,390,463 | Roters | Dec. 4, 1945 |
| 2,408,524 | Mestas | Oct. 1, 1946 |
| 2,417,097 | Warshaw | Mar. 11, 1947 |
| 2,430,757 | Conrad | Nov. 11, 1947 |